Nov. 20, 1934.    V. H. BYUS    1,981,029
ARTIFICIAL FISH LURE
Filed March 30, 1933
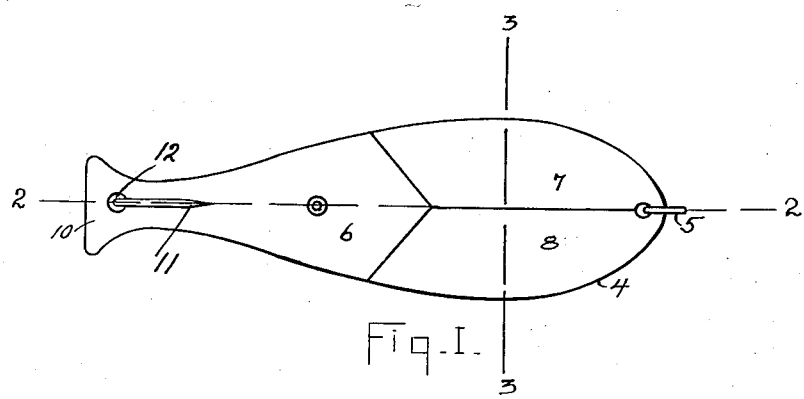
Fig. 1.
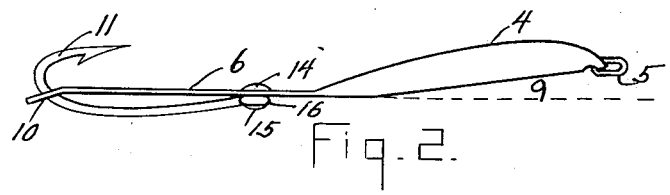
Fig. 2.
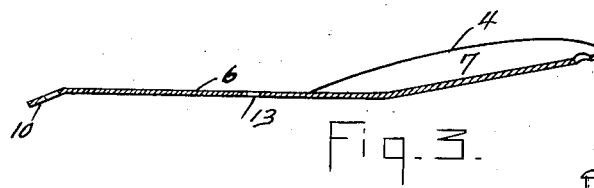
Fig. 3.
Fig. 4.
Fig. 5.
VERNON H. BYUS.  Inventor
By J. Wesley Everett
Attorney Patented Nov. 20, 1934

1,981,029

UNITED STATES PATENT OFFICE 1,981,029

ARTIFICIAL FISH LURE

Vernon H. Byus, Baltimore, Md.

Application March 30, 1933, Serial No. 663,601

3 Claims. (Cl. 43—42)

This invention relates to artificial fish bait or lure and to what is more commonly known as a spoon hook. The fish are attracted to the bait by its movement through the water and the reflection of light upon the highly polished surfaces of the spoon.

One object of the improved lure is to increase the visibility of the spoon by forming the spoon in a plurality of high polished flat surfaces.

Another object is to have a portion of the spoon adjacent the tail forming an angle with the center portion and opposite to an angle formed by the forward portion with the center which causes the spoon to dart from side to side as it is drawn through the water.

Still another object is in the manner in which the hook is secured to the spoon. A standard hook is attached to the spoon by a rivet passing through the eye of the hook and a convenient aperture in the spoon, the lower end of the hook is securely held in position by passing the same through an aperture provided near the lower end or tail of the spoon, thus providing a very cheap and sturdy construction.

With the above and other objects in view as will hereinafter be apparent, the several novel features of the invention in its preferred form will be more fully described in the accompanying drawing in which:

Figure 1 is a front view of the spoon hook.

Figure 2 is a side view.

Figure 3 is a longitudinal section therethrough on the line 2—2 of Figure 1.

Figure 4 is a vertical cross-section on the line 3—3 of Fig. 1.

Figure 5 is a hollow rivet preferably used in securing the hook to the spoon.

The invention therefore includes a metal body 4 hereinafter known as a spoon. The general appearance of which resembles a small fish or minnow. A link 5 is provided at the head or forward portion of the spoon for attaching the free end of a fishing line by which the spoon may be manipulated. The portion of the spoon upon which the hook is secured is a substantially flat surface as designated by numeral 6. The forward end of the spoon is bent inwardly from the horizontal plane of the flat surface 6 as shown by numeral 9. The forward end is also formed in two flat surfaces 7 and 8. The tail portion 10 is bent out of horizontal line with surface 6 in an opposite direction to the forward portion. A hook member 11 is inserted through the aperture 12 of the spoon near the tail, the eye of which is made to register with an aperture 13 in the surface 6, through which is inserted a rivet 14. As shown in the drawing a hollow type rivet is preferable, but any convenient style may be substituted therefor. The outer portion of the rivet 15 is then burred over the eye portion of the shank 16, rigidly securing the hook in position on the spoon.

The advantages of the spoon are easily perceived, the bent portion 10 of the tail in one direction and the head portion bent in another, causes the bait to dart most quickly through the water in imitation of a small fish. The flat highly polished surfaces 6, 7, 8, and 10 all reflect light at different angles, the advantage of which, is as the spoon darts through the water the angles are constantly changing reflecting the light from the said flat surfaces in numerous directions. The flat surfaces offer a greater reflecting element and increase the visibility of the spoon over the concavo-convexed type of spoon now available on the market.

I claim:

1. A spoon hook comprising a metal body having a forward portion and a portion extending rearwardly from the forward portion, the forward portion having a rounded front end and a part tapered rearwardly toward the extended portion, said forward portion being bent upwardly to form an angle with the extended portion and bent longitudinally to form converging flat side sections, said extended portion being tapered rearwardly and having means thereon for securing a hook, said hook having its shank secured to a part of the extended portion adjacent the forward portion and its barb extending over the rear upper surface thereof, and means provided at the rounded forward end for connecting a trolling line thereto.

2. A spoon hook comprising a metal body having a forward portion and a flat portion extending rearwardly from the forward portion, the forward portion having a rounded front end and a part tapered rearwardly toward the flat extended portion, said forward portion being bent up to form an angle with the extended portion and bent longitudinally to form converging flat side sections, said extended portion being tapered rearwardly and having means thereon for securing a hook, said hook having its shank secured to a part of the extended portion adjacent the forward portion and its barb extending over the rear upper surface thereof.

3. A spoon hook comprising a metal body having a forward portion and a flat portion extending rearwardly from the forward portion, the forward portion having a rounded front end and a part tapered rearwardly toward the flat extended portion, said forward portion being bent upwardly to form an angle with the extended portion and bent longitudinally to form converging flat side sections, said extended portion being tapered rearwardly and having means thereon for securing a hook, a rear section bent to form an angle with the extended portion and in a direction opposite to that of the forward portion, said hook having its shank secured to a part of the flat extended portion adjacent the forward portion and its barb extending over the rear upper surface thereof.

VERNON H. BYUS.